US010038644B2

(12) United States Patent
Bullock et al.

(10) Patent No.: US 10,038,644 B2
(45) Date of Patent: Jul. 31, 2018

(54) COMMUNICATION SYSTEM FOR RESOURCE USAGE MONITORING

(71) Applicant: BANK OF AMERICA CORPORATION, Charlotte, NC (US)

(72) Inventors: Caitlin Chrisman Bullock, Durham, NC (US); Matthew Eugene Clark, Milpitas, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 175 days.

(21) Appl. No.: 15/166,994

(22) Filed: May 27, 2016

(65) Prior Publication Data

US 2017/0346756 A1 Nov. 30, 2017

(51) Int. Cl.
| G06F 15/16 | (2006.01) |
| H04L 12/911 | (2013.01) |
| H04L 29/08 | (2006.01) |
| H04L 12/26 | (2006.01) |
| G06F 8/65 | (2018.01) |
| G06F 12/00 | (2006.01) |
| H04W 88/02 | (2009.01) |

(52) U.S. Cl.
CPC ............... *H04L 47/70* (2013.01); *G06F 8/65* (2013.01); *H04L 43/08* (2013.01); *H04L 67/20* (2013.01); *H04W 88/02* (2013.01)

(58) Field of Classification Search
CPC ......... H04L 43/08; H04L 47/70; H04L 67/20; H04W 88/02; G06F 8/65; G06F 21/572; G06F 2009/45595; G06F 9/45558; G06F 11/3003; G06F 11/3051; G06F 21/57; G06F 21/575; G06F 21/577; G06F 2201/865; G06F 2201/88; G06F 2221/033
See application file for complete search history.

(56) References Cited

U.S. PATENT DOCUMENTS

| 6,311,159 | B1 | 10/2001 | Van Tichelen et al. |
| 6,757,362 | B1 | 6/2004 | Cooper et al. |
| 6,965,868 | B1 | 11/2005 | Bednarek |
| 7,415,100 | B2 | 8/2008 | Cooper et al. |
| 7,546,254 | B2 | 6/2009 | Bednarek |
| 7,920,678 | B2 | 4/2011 | Cooper et al. |
| 8,731,942 | B2 | 5/2014 | Cheyer et al. |
| 8,955,076 | B1 * | 2/2015 | Faibish .................. H04L 63/08 726/7 |
| 9,609,544 | B2 * | 3/2017 | Raleigh ............... H04L 41/0893 |
| 9,692,742 | B1 * | 6/2017 | VanLund ............... H04L 63/08 |
| 2009/0234700 | A1 | 9/2009 | Galvin et al. |
| 2012/0016678 | A1 | 1/2012 | Gruber et al. |

(Continued)

*Primary Examiner* — Zarni Maung
(74) *Attorney, Agent, or Firm* — Michael A. Springs; Moore & Van Allen PLLC; Nicholas C. Russell

(57) ABSTRACT

A system for accessing resources and monitoring the use of resources by a user includes a mobile device, a resource access communication device, an optional secondary communication system, and a third party system, each of which have communication interfaces, memory devices, and processing devices. The system is designed to detect audible, visible, and/or written input from a user and effectuate responses to requests contained in such input. In some embodiments, a message may be directed to the user through visual and/or audio displays to notify the user of the messages sent in response to the user's request.

18 Claims, 6 Drawing Sheets

(56) References Cited

U.S. PATENT DOCUMENTS

| | | |
|---|---|---|
| 2012/0136997 A1* | 5/2012 | Yan .................. G06Q 10/06313 709/225 |
| 2012/0233314 A1* | 9/2012 | Jakobsson .......... G06Q 30/0225 709/224 |
| 2012/0265874 A1* | 10/2012 | Hoh ...................... G06Q 10/02 709/224 |
| 2013/0031476 A1 | 1/2013 | Coin et al. |
| 2013/0104197 A1* | 4/2013 | Nandakumar .......... G06F 21/36 726/4 |
| 2013/0152092 A1 | 6/2013 | Yadgar |
| 2013/0282438 A1 | 10/2013 | Hunter et al. |
| 2014/0109085 A1* | 4/2014 | Carrara ..................... G06F 8/61 717/178 |
| 2014/0222436 A1 | 8/2014 | Binder et al. |
| 2014/0229208 A1 | 8/2014 | Tamayo |
| 2014/0229405 A1 | 8/2014 | Govrin et al. |
| 2014/0230036 A1* | 8/2014 | Nandakumar .......... H04L 9/321 726/7 |
| 2015/0294322 A1 | 10/2015 | Grigg et al. |
| 2016/0012375 A1 | 1/2016 | Hanson et al. |
| 2016/0012409 A1 | 1/2016 | Hanson et al. |
| 2016/0012412 A1 | 1/2016 | Scanlon et al. |
| 2016/0012496 A1 | 1/2016 | Hanson et al. |
| 2016/0012505 A1 | 1/2016 | Hanson et al. |
| 2016/0014552 A1 | 1/2016 | Hanson et al. |
| 2016/0112397 A1* | 4/2016 | Mankovskii .......... H04L 63/105 726/6 |
| 2016/0293134 A1* | 10/2016 | Fortin ................... A63F 13/355 |
| 2017/0324633 A1* | 11/2017 | Lehner ................ H04L 43/0876 |
| 2017/0346757 A1* | 11/2017 | Achtner ................. H04L 47/70 |

* cited by examiner

COMMUNICATION SYSTEM FOR RESOURCE USAGE MONITORING

BACKGROUND

Users of mobile devices with high levels of computing power and network connectivity capability are able to access and use resources from multiple sources and access points. While automatic and/or otherwise streamlined access to resources can speed the deployment of resources across platforms, the inability of an individual user to readily and/or effectively monitor resource usage across the multiple sources and access often gives rise to suboptimal efficiencies in resource allocation and usage.

BRIEF SUMMARY

Embodiments of the present invention provide an innovative system, method and apparatus for securely communicating and monitoring the use of resources by a user and amongst devices associated with that user.

In some embodiments, a resource access communication system comprises a network communication interface; a resource access device communication interface; memory device storing a resource access communication application; and a processing device operatively coupled to the memory device, wherein the processing device is configured to execute computer-readable program code to: receive via the resource access device communication interface a resource access request from a user of a resource access device; receive via the network communication interface a set of resource usage data associated with the user; and in response to receiving the resource access request and the set of resource usage data, transmit via the resource access device communication interface a control signal comprising a set of message data associated with the user, wherein the control signal causes a message to be presented to the user.

In some example implementations of such embodiments, the processing device is further configured to execute computer readable program code to parse the resource access request and detect a subset of resource access data associated with the resource access request.

In some such example implementations and in other example implementations, the resource access request comprises an audible communication from the user. In some such example implementations and in other example implementations, the resource access request comprises a written communication from the user.

In some example implementations of such embodiments, the message presented to the user is an audible message transmitted via a speaker associated with the resource access device. In some such example implementations, and in other example implementations, the message presented to the user is a visible message displayed on the resource access device.

In some example implementations of such embodiments, the resource usage data comprises a set of data received via the network communication interface from a financial institution. In some such example implementations and in other example implementations, the resource usage data further comprises a set of data received via the network communication interface from a third-party system.

In some example implementations of such embodiments, the processing device is further configured to execute computer readable program code to open a communication channel between the resource access device and the financial institution.

In some embodiments, a method for resource access communication comprises: receiving via a resource access device communication interface a resource access request from a user of a resource access device; receiving via a network communication interface a set of resource usage data associated with the user; and in response to receiving the resource access request and the set of resource usage data, transmitting via the resource access device communication interface a control signal comprising a set of message data associated with the user, wherein the control signal causes a message to be presented to the user.

In some example implementations of such embodiments, the method comprises parsing the resource access request and detecting a subset of resource access data associated with the resource access request. In some such example implementations and in other example implementations, the resource access request comprises an audible communication from the user. In some such example implementations and in other example implementations, the resource access request comprises a written communication from the user.

In some example implementations of such embodiments, the message presented to the user is an audible message transmitted via a speaker associated with the resource access device. In some such example implementations and in other example implementations, the message presented to the user is a visible message displayed on the resource access device.

In some example implementations of such embodiments, the resource usage data comprises a set of data received via the network communication interface from a financial institution. In some such example implementations and in other example implementations, the resource usage data further comprises a set of data received via the network communication interface from a third-party system.

In some example implementations of such embodiments, the method of claim further comprises opening a communication channel between the resource access device and the financial institution.

In some example embodiments, a resource access communication system comprises: a network communication interface; a resource access device communication interface; a memory device storing a resource access communication application; and a processing device operatively coupled to the memory device, wherein the processing device is configured to execute computer-readable program code to: receive via the resource access device communication interface a resource access request from a user of a resource access device, wherein the resource access request is an audible communication from the user; parse the resource access request to detect a subset of resource access data associated with the resource access request; receive via the network communication interface a set of resource usage data associated with the user, wherein the resource usage data comprises a set of data received via the network communication interface from a financial institution and a set of data received via the network communication interface from a third-party system; and in response to receiving the resource access request and the set of resource usage data, transmit via the resource access device communication interface a control signal causing a communication channel between the resource access device and the financial institution to be opened.

In some example implementations of such embodiments, the processing device is further configured to execute computer readable program code to transmit a control signal causing an audible message to be presented to the user via a speaker associated with the resource access device.

DETAILED DESCRIPTION OF EMBODIMENTS OF THE INVENTION

Figure 1:
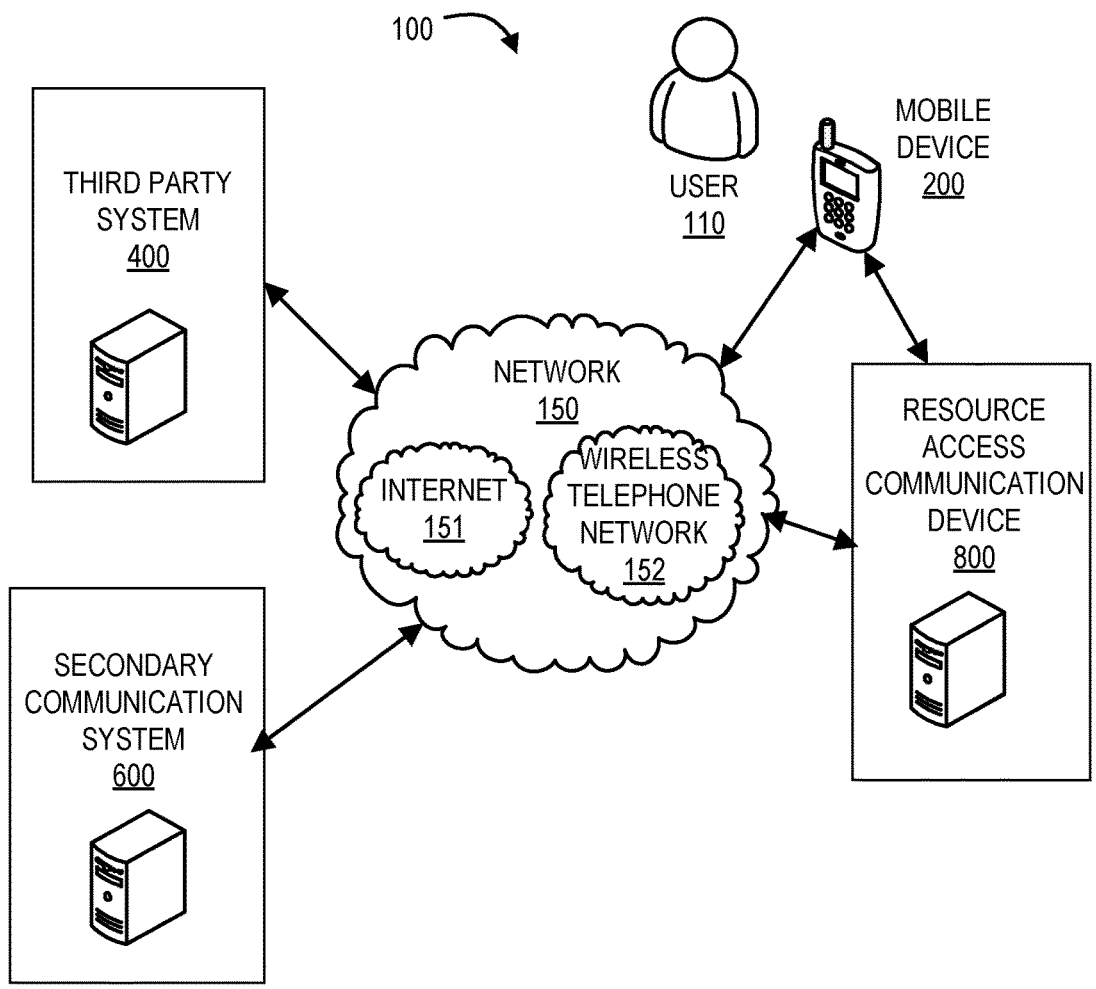
FIG. 1 is a block diagram illustrating a communication system for resource usage monitoring, in accordance with embodiments of the invention.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Many of the example embodiments and implementations described herein contemplate interactions engaged in by a resource user with a mobile device and/or one or more resource access communication devices and/or secondary communication devices. A "user", as referenced herein, may refer to an entity or individual that has the ability and/or authorization to access and use one or more resources or portions of a resource. Furthermore, as used herein, the term "user device" or "mobile device" may refer to mobile phones, personal computing devices, tablet computers, wearable devices, and/or any portable electronic device capable of receiving and/or storing data therein.

As used herein, the term "resource" will generally refer to objects, products, goods, commodities, services, and the like, and/or the ability and opportunity to access and use the same. Some example implementations herein contemplate property held by a user, including property that is stored and/or maintained by a third party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. Examples of resources that may not necessarily be associated with accounts may be particularized goods, such as distinct pieces of furniture, equipment, or other valuables, or the like. Similarly, "funds" or "available balance" refer to types of resources. For example, the term "fund" may be used to refer to one or more sets of monetary resources available to a user, and may also be referred to as an available balance, a collected balance, good funds, and usable funds.

In the context of example implementations described herein, a "transaction" or "resource distribution" refers to any transfer of resources and/or an obligation to return resources to and/or from a user. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

In accordance with embodiments of the invention, the terms "financial institution" and "financial entity" include any organization that processes financial transactions including, but not limited to, banks, credit unions, savings and loan associations, investment companies, stock brokerages, asset management firms, insurance companies and the like.

Many of the embodiments and example implementations thereof described herein are directed toward solving the myriad technical problems associated with effectively monitoring and managing resource usage and deployment when resources may be accessed and deployed in multiple way across multiple platforms. Such technical difficulties can be compounded when resources may be deployed, accessed, and accumulated automatically and/or outside of the direct control of a user in every instance wherein a resource or portion thereof is deployed, accessed, and/or accumulated. With the aim of allowing a user an effective and efficient tool to monitor and access resources and conduct communications regarding the same, many example embodiments of the invention disclosed herein contemplate resource access communication device and/or module that is capable of serving as an interface between a user on the one hand and a user's mobile device, one or more third-party systems associated with the user and/or resources associated with the user, and, in some instances, one or more secondary communication devices on the other hand.

In some example implementations, a resource access communication device is capable of interacting with a user in the sense that it can detect and parse audible statements from a user (including but not limited to spoken commands, spoken questions, and other user speech) and/or written content from a user (including but not limited to text input by a user and/or other written commands or statements), and responding to the user in the form of performing transactions, transmitting credentials, establishing communication channels, prompting the user to perform one or more actions, scheduling meetings with personnel associated with one or more resources, and the like.

Many example implementations are particularly directed to a user's interaction with resources associated with the user and stored or otherwise associated with a third party financial institution. In some such implementations, a resource access communication device, as either a stand-alone device or one integrated into a user's mobile device, is capable of interacting with a mobile banking application to facilitate the efficient and effective access, deployment, and accumulation of resources by the user. For example, a resource access communication device that is capable of detecting and processing voice commands may be used by a user to translate statements made by the user, into operative transactions, such as the satisfaction of obligations, transfers of resources, subscription to certain products and/or services, responding to offers, and the like. Similarly, a resource access communication device that is capable of detecting and processing written statements from a user, such as text messages or other written messages may likewise be used to effectuate transactions and operations associated with resources and otherwise respond to user input.

Some example implementations contemplate resource access communication devices that are able to detect, parse, and respond to predetermined command words or phrases, colloquial and/or non-specific language, and/or other natural language in a manner that allows a user to effectively monitor and manage their resource usage. For example, such a resource access communication device may be capable of recognizing a statements such as "check my transaction history", "pay all outstanding obligations", or other similar declarative commands, and, in response to such commands, perform the requested operation, such as providing a copy of the user's transaction history (or a portion thereof, as requested), or such as initiating transactions to pay any bills or other obligations that have not yet been paid. In another example, a resource access communication device may be able to respond to questions such as "has my paycheck been deposited", "am I on track to retire", "tell me about this transaction I don't recognize" by requesting and receiving the appropriate data set and/or message information, and conveying it to the user. In another example, a resource access communication device may be configured to perform operations based on other input received from the user and/or information received from one or more third parties or other sources. In one such example, a user may articulate that certain items should be added to a grocery or other shopping list, that one or more goods or services are necessary for a home or vehicle, or the like. In response to the user input, the resource access communication device may locate and/or compile offers associated with the goods, services, and/or other products associated with the statements made by the user, and convey those offers and/or other information to the user.

While some example implementations contemplate a resource access communication device and/or module that is integrated into a user's mobile device, some example implementations contemplate one or more stand-alone resource access communication devices and/or one or more secondary communications devices. Some users may derive particularized benefits by having secondary communication devices deployed in advantageous positions around a home, workspace, or other locations, wherein such secondary communication devices are capable of communicating user input to a resource access communication device and relaying information back to the user. For example, a user may opt to position one secondary communication device in a kitchen, and recite items that may be needed for the completion of a particular recipe or a grocery list. The secondary communication device can in turn relay the information to a resource access communication device for further processing, and relay back to the user any response from the resource access communication device. Similarly, a user may opt to position a secondary communication device near where the user often processes mail or other correspondence, such that the user can provide instructions to pay bills or otherwise interact with service providers, entities associated with offers received by the user, and other entities associated with correspondence received by the user. Those skilled in the art will appreciate that a user may opt to position such secondary communication devices in any location where it may be advantageous to be able to issue speaking and/or written commands or statements to provide information about potential resource uses, initiate transactions, and/or otherwise monitor the status and use of resources.

FIG. 1 provides a block diagram illustrating an environment 100 for a system for resource access and usage monitoring, in accordance with an embodiment of the invention. In some embodiments, the user resource includes financial assets that are securely distributed in a system associated with the user and/or one or more third party systems. As illustrated in FIG. 1, the environment 100 includes a user 110 where the user represents a customer having a relationship with at least one financial institution. A user of the system may be a person, but may also be a business or any other entity. In a typical environment thousands of users may access the system of the invention.

The environment 100 also may include a plurality of user devices. The user devices may comprise any machine, apparatus, system or the like that may be connected to and communicate with other devices over network 150. At least one of the devices may comprise a mobile device 200 for use by the user 110. The mobile device 200 may be any portable device that employs a processor and memory and can perform computing functions, and that may be connected to or access network 150. As used herein, the mobile device 200 may comprise any mobile communication device, such as a cellular telecommunications device (i.e., a cell phone or mobile phone), personal digital assistant (PDA), a mobile Internet accessing device, or other mobile device. The mobile device 200 may be connected to a network by wireless access such as wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology.

The mobile device 200 may be configured to communicate over network 150 with at least one third party entity system 400 of a third party entity such as a financial institution and with one or more resource access communication devices, such as resource access communication device 800 as will hereinafter be described. As shown in FIG. 1, the mobile device 200 may also be configured to be in direct machine-to-machine communication with resource access communication device 800. In some example implementations, the resource access communication device 800 may be incorporated into the mobile device 200. The mobile device 200 may also be configured to communicate over network 150 with one or more secondary communication systems 600 as will hereinafter be described. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet 151. In one embodiment, the network 150 may also include a wireless telephone network 152.

In general, the mobile device 200 is configured to connect with the network 150 and may be used to log the user 110 into the third party entity system 400 of the third party financial institution. A user 110 in order to access the user's account(s) typically uses an online banking application and/or mobile banking application on the third party entity system 400 and must authenticate with the third party entity system 400. For example, logging into the third party entity system 400 generally requires that the user 110 authenticate his/her/its identity using a user name, a passcode, a cookie, a biometric identifier, a private key, a token, and/or another authentication mechanism that is provided by or for the user 110 to the third party entity system 400 via the mobile device 200. In some embodiments the authentication system may be a tiered system that may require different levels of authentication based on conditions such as, for example, previous activity of the user over the network 150. For example, the tiered authentication system may have three levels of authentication—hard, medium and soft. Hard authentication may require that the user input a high level of authentication information such as a combination of password, user identification, answer to challenge questions, biometrics, random key number or the like. A hard authentication may be required when the user logs on from an unrecognized user device or where the user activity is not recognized by the system. A medium authentication level may require only a user identification and password. A medium level of authentication may be required where, for example, the user has already logged-in to the mobile device 200 using an authentication procedure for the device such as a thumbprint or password. A soft authentication may require only a user identification such as user name. A soft level of authentication may be used, for example, where the user has already logged-in to the mobile device 200 using an authentication procedure for the device such as a thumbprint or password and the user has performed activities on the user device that are recognized as "normal" activity for that user and/or the user device is in a recognized location for that user. Thus, the level of authentication required for accessing the banking application, whether online, mobile or in person, may be adjusted based on conditions, activity, functions or information received about or from the user.

Figure 2:
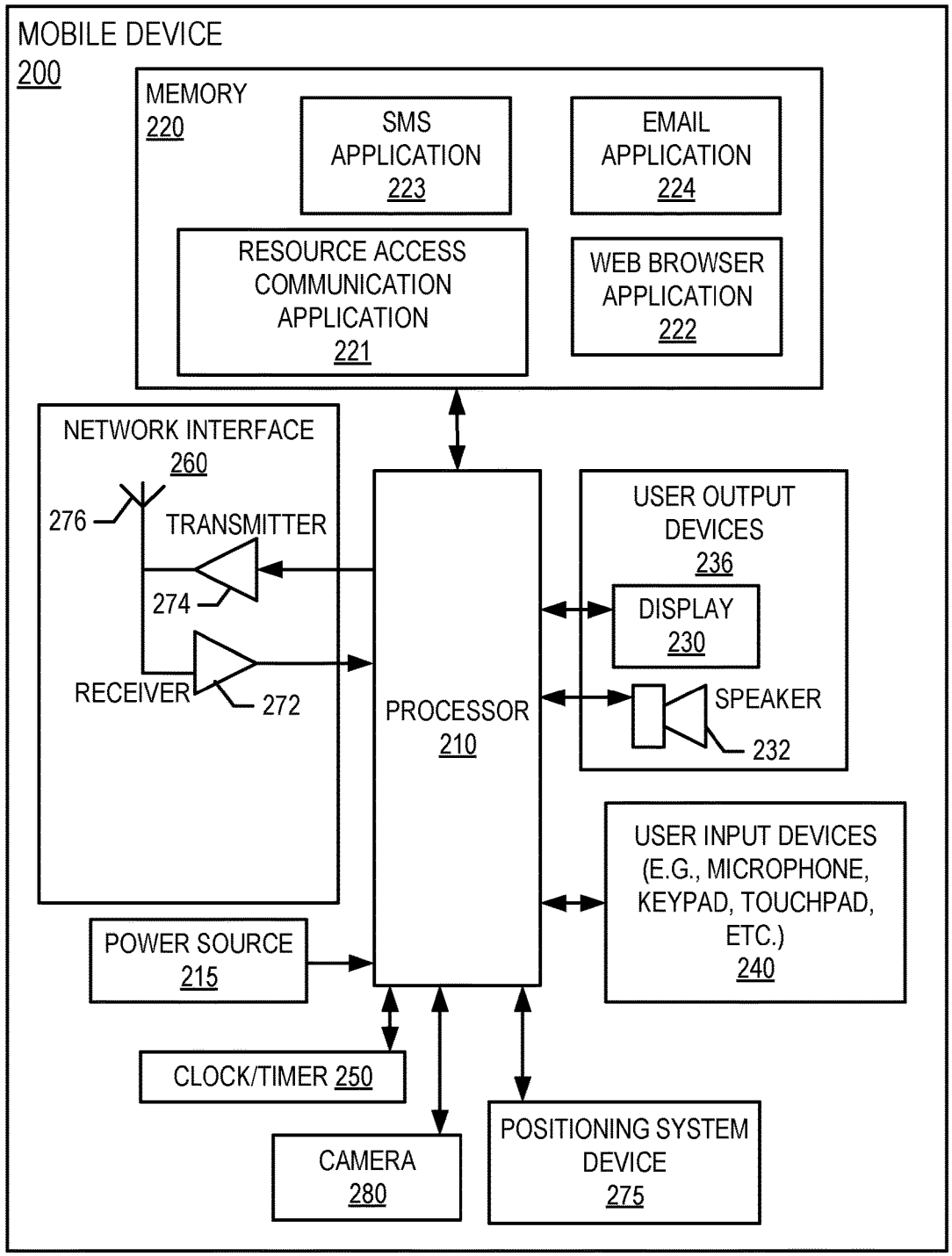
FIG. 2 is a block diagram illustrating an example mobile computing device as depicted in FIG. 1, in accordance with embodiments of the invention.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone and the embodiment of the mobile device 200 shown in FIG. 2 are merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, tablets, mobile televisions, gaming devices, laptop computers, cameras, video recorders, audio/video player, radio, GPS devices, or any combination of the aforementioned.

Some embodiments of the mobile device 200 include a processor 210 communicably coupled to such devices as a memory 220, user output devices 236, user input devices 240, and a network interface 260. The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like. The memory device 220 may include other applications such as e-mail application 224 and SMS application 223.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks. The processor 210 may also be configured to use a camera 280 to capture and/or recognize images and/or a positioning system device 275, such as a compass, GPS system, or other device capable of identifying a position and/or location of the mobile device 200.

As described above, the mobile device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to transmit data, may include any of a number of devices allowing the mobile device 200 to transmit data, such as a keypad, keyboard, touch-screen, touchpad, microphone, mouse, joystick, other pointer device, button, soft key, and/or other input device(s).

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which comprise computer-executable instructions/code executed by the processor 210 to implement the functions of the mobile 200 and/or one or more of the process/method steps described herein. The memory 220 includes a resource access communication application 221 that may be used to allow communication with a third party system such as the third party entity system 400 and/or the resource access communication device 800 and/or the secondary communication device 600 to implement the system of the invention. The use of the resource access communication application 221 may facilitate access to the system of the invention by providing log-in systems including user authentication systems, account information, system controls or the like. The resource access communication application 221 also communicates with the third party entity system 400 to allow the user to set up and/or control the system of the invention and may be used to initiate and coordinate transactions, the acquisition of user information, the transfer of user input, the communication of responses, offers, and other information to the user, and the like.

These applications also typically provide a graphical user interface (GUI) on the display 230 that allows the user 110 to communicate with the mobile device 200, the third party entity system 400 and/or other devices or systems. The memory 220 can also store any of a number of pieces of information and data used by the mobile device 200 and the applications and devices that make up the mobile device 200 or are in communication with the mobile device 200 to implement the functions of the mobile device 200 and/or the other systems described herein. For example, the memory 220 may include such data as user authentication information.

Figure 3:
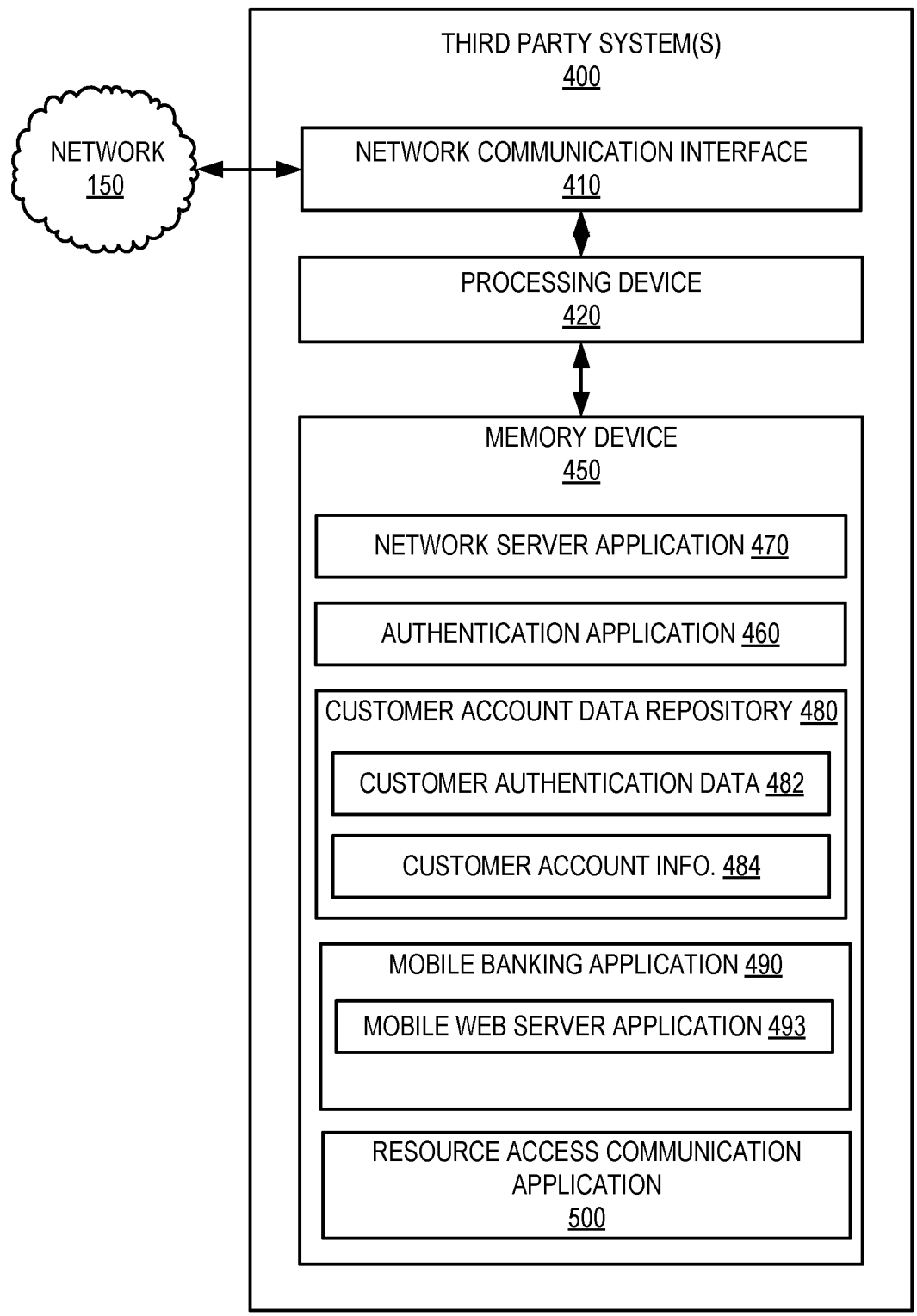
FIG. 3 is a block diagram illustrating an example third party system as depicted in FIG. 1, in accordance with embodiments of the invention.
Figure 4:
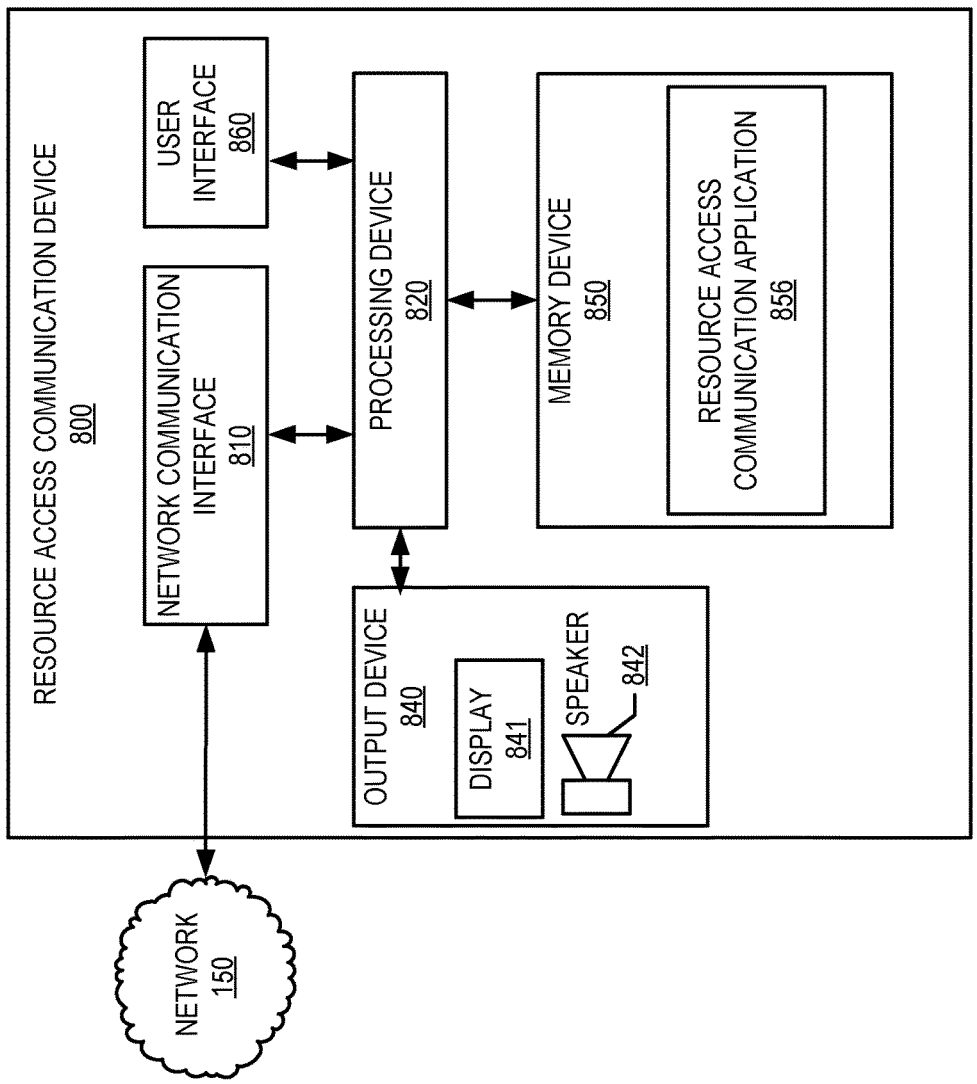
FIG. 4 is a block diagram illustrating an example resource access communication device as depicted in FIG. 1, in accordance with embodiments of the invention.

FIG. 3 provides a block diagram illustrating the third party system such as third party entity system 400, in greater detail, in accordance with embodiments of the invention. As illustrated in FIG. 4, in one embodiment of the invention, the third party entity system 400 includes one or more processing devices 420 operatively coupled to a network communication interface 410 and a memory device 450. In certain embodiments, the third party entity system 400 is operated by an entity, such as a financial institution.

It should be understood that the memory device 450 may include one or more databases or other data structures/repositories. The memory device 450 also includes computer-executable program code that instructs the processing device 420 to operate the network communication interface 410 to perform certain communication functions of the third party entity system 400 described herein. For example, in one embodiment of the third party entity system 400, the memory device 450 includes, but is not limited to, a network server application 470, an authentication application 460, a customer account data repository 480 which includes customer authentication data 480 and customer account information 484, a mobile banking application 490 comprising a mobile web server application 493, and other computer-executable instructions or other data. The computer-executable program code of the network server application 470, the authentication application 460, or the mobile banking application 490 may instruct the processing device 420 to perform certain logic, data-processing, and data-storing functions of the third party system(s) 400 described herein, as well as communication functions of the third party system(s) 400. The mobile banking application 490 communicates with the user mobile device 200 to facilitate communication between the user and the financial institution.

In one embodiment, the customer account data repository 480 includes customer authentication data 482 and customer account information 484. The network server application 470, the authentication application 460, and the mobile banking application 490 are configured to invoke or use the customer account information 484, the customer authentication data 482 when authenticating a user to the third party system(s) 400.

The third party entity system 400 further includes a resource access communication application 500 that communicates with the user's mobile device 200 and may communicate with the secondary communication system(s) 600. The resource access communication application 500 functions to manage a user's resources as informed by the resource access communication application 856 of the resource management device 800.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as the mobile device 200, the resource management device 800 and/or the secondary communication system 600. The processing device 420 is configured to use the network communication interface 410 to transmit and/or receive data and/or commands to and/or from the other devices connected to the network 150.

As illustrated in FIG. 4, one exemplary resource access communication device 800 may generally include, but is not limited to, a network communication interface 810, a processing device 820, one or more output devices 840, a memory device 850, and a user interface 860 such as described herein. The processing device 820 is operatively coupled to the network communication interface 810, the memory device 850 and the user interface 860. In one embodiment, applications having computer-executable program code that instructs the processing device 820 to operate the various functions of the resource usage monitoring device to perform certain communication functions and to perform certain logic, data processing, and data storing functions of the application as described herein are stored in memory device 850. The applications may comprise a resource access communication application 856 that communicates with the mobile device 200, the third party system 400, and, optionally, the secondary communication system 600 as will be described.

The resource access communication device may also have an output device 840 for controlling the physical operation of the output of the device. The output device 840 may comprise one or more displays 841 for presenting visual information to one or more users. The display 841 may communicate with the processing device 820 to provide content to be displayed. The output device 840 may also comprise one or more speakers 842 for presenting audio information to one or more users. The output device 840 may also comprise controllers such as programmable logic controllers (PLC), proportional integral derivative controllers (PID) or other machine controllers.

The network communication interface 810 is a communication interface having one or more communication devices configured to communicate with one or more other devices on the network 150. The processing device 820 is configured to use the network communication interface 810 to receive information from and/or provide information and commands to other devices and systems via the network 150. The network communication interface 810 may be over a wireless connection or a wired connection such as described above, and may facilitate communication between the resource usage monitoring device 800 and the mobile device 200, the third party system 400, and/or the secondary communication system 600. In some example implementations, the resource access communication device may be configured to be incorporated into a mobile device 200 or put in direct machine-to-machine communication with a mobile device 200. In such example implementations, the network communication interface 810 may be configured and used to accommodate such direct and/or integrated communication, or a separate interface may be included in resource access communication device 800 to accommodate such direct and/or integrated communication.

The resource access communication device 800 may also comprise a user interface 860. The user interface 860 allows inbound and/or outbound communication with the resource access communication device and may take a wide variety of forms depending on the type of resource access communication device 800. The user interface may comprise interface devices as otherwise described herein, or may comprise other user interface devices. For example, the user interface 860 may be configured to accept sounds, speech, gestural signals, written information and/or other communication directly from a user and/or transmitted by another device. In some embodiments the user interface 860 may be controlled by the third party entity such that the resource access communication device 800 is secure. In some embodiments, such as where the resource access communication device is integrated with the mobile device 200, the user interface 860 may use any user interface associated with the mobile device 200. In some embodiments, the resource access communication application 856, processing device 820 and the memory device 850 are operable to communicate with and/or effect a transaction with a third party system 400. The resource access communication application 856 of resource access communication device 800 communicates with a third party system such as third party entity system 400. In other words, the resource access communication device 800 is programmed with the resource usage monitoring application 856 to communicate with a third party system (e.g. the third party entity system 400) where the third party system is capable of effectuating the movement and/or transfer of resources from one location and/or association to another location and/or association.

Figure 5:
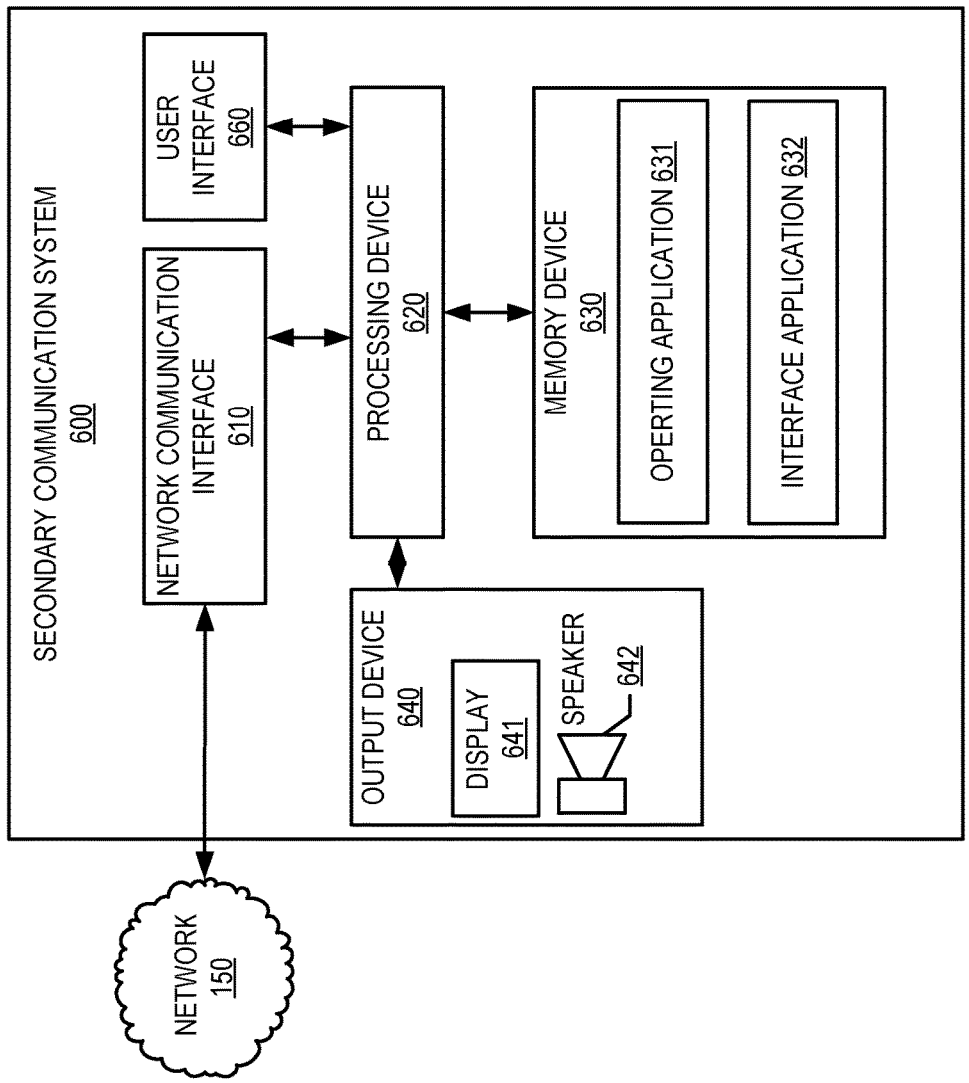
FIG. 5 is a block diagram illustrating an example secondary communication device in accordance with embodiments of the invention.

FIG. 5 provides a block diagram illustrating an optional secondary communication system 600, in accordance with embodiments of the invention. A "secondary communication system" as used herein means a device, apparatus and/or system that is capable of communicating with and transmitting information or data to and/or receiving information or data from other devices, systems or apparatuses including over network 150 and present information to a user. FIG. 5 illustrates an exemplary embodiment of a secondary communication system. The secondary communication system 600 may be for example, but not limited to, a dedicated device configured to interact with a user and the resource access communication system 800, and may incorporate a display monitor, an audio transmission system, a visual transmission system, an audio-visual display, or the like. The list of secondary communications systems provided herein is not exhaustive such that the secondary communication system 600 may be any device that includes a communication interface or module, software and/or hardware that allow the device to communicate data and/or information related to the device with other devices and/or systems over network 150 and present information to a user.

As illustrated in FIG. 5, one exemplary embodiment of a secondary communication system 600 may generally include, but is not limited to, a network communication interface 610, a processing device 620, and a memory device 630 such as described herein. The processing device 620 is operatively coupled to the network communication interface 610 and the memory device 630. The secondary communication system may also have an output device 640 for controlling the physical operation of the device. The output device 640 may comprise one or more displays 641 for presenting visual information to one or more users. The display 641 may communicate with the processing device 620 to provide content to be displayed. The output 640 may also comprise one or more speakers 642 for presenting audio information to one or more users. The output device 640 may also comprise controllers such as programmable logic controllers (PLC), proportional integral derivative controllers (PID) or other machine controllers.

The secondary communication system 600 may also comprise a user interface 660. The user interface 660 allows inbound and/or outbound communication with the resource access communication device and may take a wide variety of forms depending on the type of secondary communication system 800. The user interface may comprise interface devices as otherwise described herein, or may comprise other user interface devices. For example, the user interface 660 may be configured to accept sounds, speech, gestural signals, written information and/or other communication directly from a user and/or transmitted by another device. In some embodiments the user interface 660 may be controlled by the resource access communication device 800 and/or the third party entity such that the secondary communication system 600 is secure.

In one embodiment, applications having computer-executable program code that instruct the processing device 620 to operate the various systems of the secondary communication system including network communication interface 610 to perform certain communication functions and to perform certain logic, data processing, and data storing functions of the application as described herein are stored in memory device 630. The applications may include an operating application 631 that controls the output device 640 and the functions of the secondary communication system to control operation of the secondary communication system 600 during use, along with interface application 632, which controls the network communication interface 610 and may also manage the receipt and processing of display information received by the secondary communication system 600.

The network communication interface 610 is a communication interface having one or more communication devices configured to communicate with one or more other devices on the network 150. The processing device 620 is configured to use the network communication interface 610 to receive information from and/or provide information and commands to other devices and systems via the network 150. The network communication interface 610 may be configured to communicate over a wireless connection or a wired connection such as described above, including but not limited to a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface the message display system may also include a communication interface that may be connected by a hardwire connection to the resource management device. The communication interface may comprise a connector such as a USB, SATA, PATA, SAS or other data connector for transmitting data to and from the secondary communication system. In some embodiments the secondary communication system may comprise a port or plug that is compatible with a mating port or plug on the resource access communication device.

Referring to FIGS. 1, 4 and 5, an embodiment of one process and system will be described. In this embodiment, a user 110 is in control of a mobile device 200, which is configured to communicate via network 150 with a third party system 400 and a resource access communication device 800. In this particular example embodiment, the third party system 400 is associated with a financial institution, and the user 110 has a relationship with that financial institution, at least in the sense that the financial institution holds and/or manages one or more accounts associated with the user 110. As shown in FIG. 1, and described elsewhere herein, the third party system 400 is capable of communicating via network 150 with resource access communication device 800, and the resource access communication device 800 is capable of communicating via network 150 or otherwise (such as through machine-to-machine communication over a dedicated wired or wireless channel) with optional secondary communication system 600. In some example implementations, in addition to (or alternatively to) communicating via the network 150, third party system 400 may be in direct machine-to-machine communication with resource access communication device 800.

In some contexts, the financial institution operates a mobile banking application, such as mobile banking application 490, which allows users such as user 110 to access resources associated with the user, information associated with such resources, information about the products, services, and other resources available from the financial institution, and the like via a mobile device, such as mobile device 200. In such example implementations, a resource access communication device, such as resource access communication device 800, operates as and interface and/or intermediary between the user and the mobile banking application, in the sense that the resource access communication device is configured to recognize and convert directives, statements, and other communications received from the user via a user interface, such as user interface 860, from the user into commands that are understandable by the mobile banking application and capable of being processed by the third party system. The resource access communication device is also capable of receiving information from the third party system and relaying information to the user via an output device, such as a speaker or display.

The resource access communication device, such as resource access communication device 800 acts to smooth the interface between the user 110 and the mobile device 200 and the third party system 400 in the sense that it allows the user 110 to use spoken language (such as command words or phrases, and/or natural language) or written language (such as text messages and/or other written directives or written language) to interact with a mobile banking application associated with a financial institution. Likewise the resource access communication device 800 (alone or in conjunction with optional secondary communication 600) can convey information to a user 110 in a manner in which the user may be more comfortable, such as an audible message and/or a written message.

In an example implementation, the upon receiving and recognizing a prompt from a user 110, resource access communication application 856 of resource access communication device 800 transmits a secured request such as a token to the third party system 400 over network 150 via network communication interface 810 based on information stored in memory device 850 and/or as provided by the user 110 and/or by the mobile device 200, and/or by other sources, such as secondary communication system 600 to the resource access communication device 800. The secured request typically includes a request for resource usage data, where resource usage data is a set of resource usage information that can be used by the resource access communication device 800 to determine a message associated with one or more resources to be conveyed to the user 110. The secured request may include, alternatively or in addition to a request for resource usage information, information associated with commands and/or requests from user 110, such as instructions to engage in one or more transactions. In a system that uses a token or other secured request, the resource usage data may have no intrinsic value. The secured request is informed by and transmitted in accordance with the terms, conditions, or other rules set by the third party entity system 400, the user 110, and/or the resource access communication device 800. For example, a secured request may be sent requesting account status information associated with user 110. Tokenization security systems are known where a token having no intrinsic value is substituted for sensitive data such that the authorization does not involve the transmission of sensitive data. As a result, security is enhanced and security risks from data breaches are reduced. In the present invention, the token may be substituted for user identification information, user account information, personal identification information, and/or potentially sensitive information about the use of resources by the user and/or others associated with accounts of the user, such that the token generated by the resource access communication device 800 may be attributed to a user account at the third party system 400. The mobile device 200 and the resource access communication device 800 may not have user account information or other potentially sensitive information which is instead securely maintained by the third party system 400. As a result, the security of the user's financial or otherwise sensitive information can be maintained by a single entity such that security over the user's financial or otherwise sensitive information may be controlled and enhanced.

The resource usage monitoring device 800 generates the secured request based on the set of identification information using the resource access communication application 856 and transmits the secured request using network communication interface 810 to the third party system 400 over network 150. The secured request is received by the third party system 400 and the resource usage data (such as a request for a set of information pertaining to the status of one or more accounts and/or transactions associated with the user) in the request is recognized by the third party system 400. Upon retrieving and/or receiving the requested information, the third party system 400 transmits the requested information to the resource access communication device 800 in accordance with terms and conditions associated with the resource access communication application 500. The terms and conditions of any transactions and/or resource activities and communication associated therewith may be agreed to by the user 110 and the third party entity associated with the third party system 400 and stored in resource access communication application 500. Upon engaging in a relationship with a third party entity associated with third party system 400 (such as when a customer opens an account with a financial institution and/or agrees to acquire permission to access and use resources via an application associated with mobile device 200, the user 110 may register themselves and/or their mobile device 200 with third party entity 400 and agree to interact with resource access communication device 800 such that the third party entity recognizes a secured request from resource access communication device 800 as being properly associated with the user 110 and respond to requests received from resource access communication device 800. For example, the user 110 may register through the on-line banking application 490. The user 110 may also register with the third party system 400 other than using an on-line application.

Regardless of the protocols applied when requesting, compiling, and transmitting information associated with the resource usage of a user, such as user 110, upon receipt of a set of resource usage data associated with the user 110 via the network communication interface 810, the processing device 820 and the resource access communication application 856 interact to generate at control signal comprising a set of message data associated with user 110, which in turn causes a message to be presented to the user. For example, if a user 110 speaks to the resource access communication device 800 or sends a text message to resource access communication device 800 requesting the current balance of one or more of a user's accounts, the resource access communication device 800 recognizes the input from the user 110, parses the message received from the user 110 to determine the content of the user's request and translate the request into a signal that can be conveyed to a third party system, such as third party system 400, including mobile banking application 490. The resource access communication device 800 then conveys such a signal associated with the user 110's request to the third party system 400, either directly via network 150 or via mobile device 200. Upon receiving resource usage data from the third party system 400—the current account balance information in this instance—the resource access communication device 800 responds by communicating the information to the user 110 in accordance with previously established protocols, such as by presenting an audible signal via a speaker, displaying the answer in text on a display associated with the resource access communication device 800, causing a secondary communication system 600 to convey a message to the user, causing a message to be displayed on the user's mobile device 200, or through any other suitable approach.

In some implementations, as an alternative to, or in addition to, interacting with the resource access communication device 800, the user may interact with the secondary communication device 600. As described elsewhere herein, the secondary communication device is generally capable of receiving input from a user (such as audible communication, visual communication, and/or written communication) and is capable of communicating with the resource access communication device 800 to relay the user input. Likewise, the secondary communication system 600 is capable of interacting with a control signal originating from resource access communication device 800 to present a message to the user 110. For example, a control signal originating from resource access communication device 800 may be received by network communication interface 610 via network 150, and processed by the processing device 620, the operating application 631, and the interface application 632 to cause a message to be presented to the user 110 via the display 641 or the speaker 642.

In addition to the communications from the resource access communication device 800 to a financial institution, the system 100 may allow communication to the resource access communication device 800 such that the user and/or third party system may direct the resource usage monitoring options. For example, the user may set limits on the frequency with which a financial institution may cause targeted communications be initiated to the user and may limit the extent to which and/or format in which messages and/or other information directed to the user may be presented. Such limits may be based on the preferences of the user, the perceived importance of the messages, the policies of the financial institution, and other factors. The user may directly communicate with the resource access communication device 800 and/or communicate over network 150 using mobile 200 or the user instructions may be communicated to the third party system 400 from the user such as by mobile device 200 over network 150 and the third party institution system 400 may communicate with the resource access communication device 800 over network 150. In some embodiments the limits or controls put on the resource access communication device 800 may originate with the third party system 400 such that the resource access communication device may be controlled at least in part by the third party system.

Figure 6:
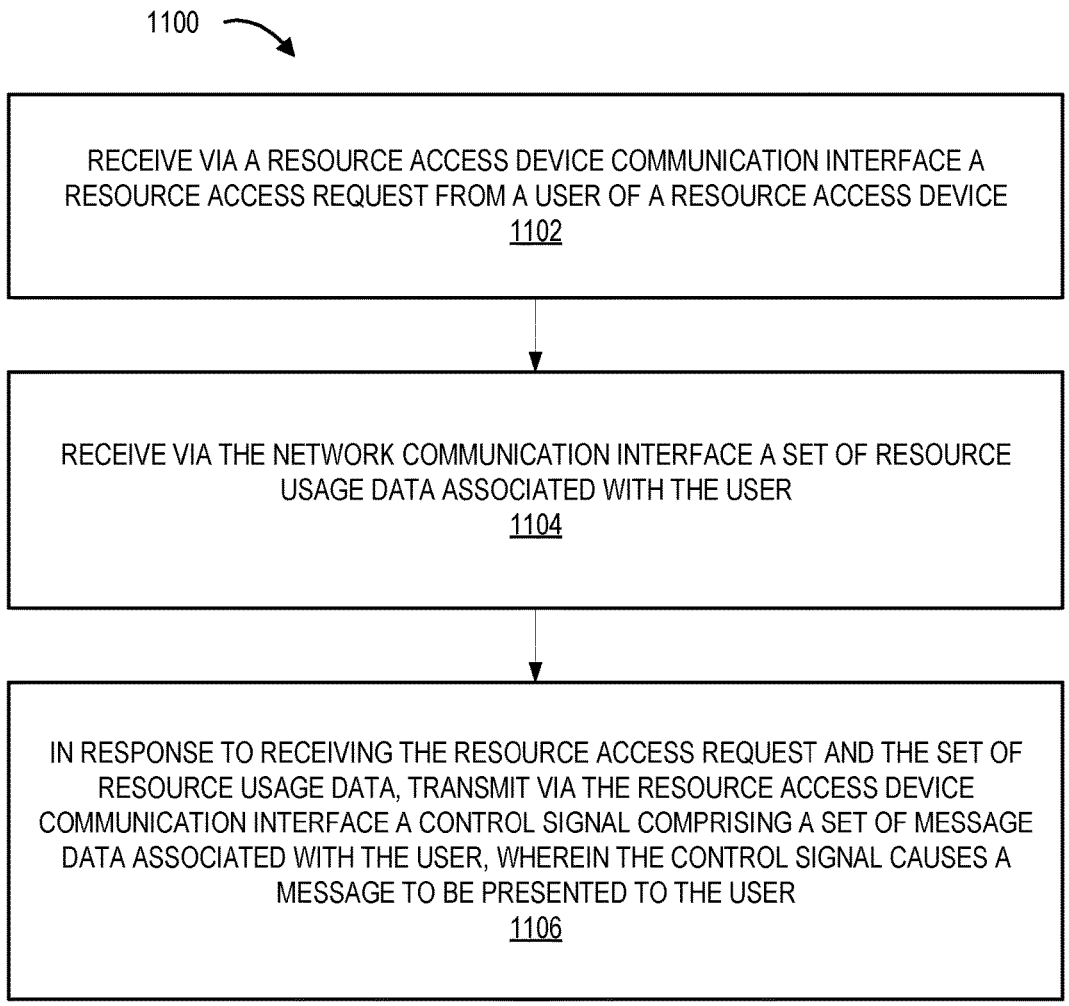
FIG. 6 is a flowchart illustrating an example methods for communication for resource usage monitoring in accordance with embodiments of the invention.

FIG. 6 depicts a process 1100 for resource access and usage monitoring and communication in accordance with embodiments of the invention. As depicted in FIG. 6, process 1100 commences at block 1102, which includes receiving via a resource access device communication interface a resource access request from a user of a resource access device. In example implementations of block 1102, the resource access communication interface is a user interface, such as a microphone, camera, touch screen, keypad, wireless and/or wired communication interface, and/or any other interface that permits information to be conveyed to a resource access communication device. In some example implementations of block 1102, the resource access request can take the form of any request associated with an interaction with one or more resources (or portions thereof) associated with the user or resources that the user may become associated with. For example, in the context of a user's financial resources, the resource access request may take the form of a request to perform a transaction, to check the status of an account and/or a transaction, to acquire information about products and/or service, to save information related to potential future transaction, and the like.

It should be appreciated that a resource access request can be conveyed (and thus received) in myriad forms, including via an audible communication from the user (such as spoken words, sounds, or other audible transmissions), a written communication from the user (such as a text message, written message, and/or other command), a non-written visual communication (such as one or more facial and/or body movements, gestures, or the like). In some implementations, the resource access communication device may need to apply protocols, including protocols stored in an application associated with the resource access communication device, to parse the resource access request and detect a subset of resource access data (such as a particular command, or recognized set of information pertaining to a request) associated with the resource access request.

As shown in FIG. 6, process 1100 continues with block 1104, which includes receiving via the network communication interface a set of resource usage data associated with the user. It will be appreciated that in most implementations of block 1104, the content of the set of resource usage data will be dependent, at least in part, on the content of the resource access request. For example, if a user's resource access request is aimed at ascertaining the status of an account associated with the user, the resource usage data will typically include information about the account referenced in the request. Likewise, in situations where a user's resource access request includes a request for information, the resource usage data will typically include the requested information. In some example implementations, the resource usage data will comprise a set of information received via a network communication interface from a third party system, such as a system associated with a financial institution. In some example implementations, the resource usage data may originate from other sources, such as utility companies, other service providers, merchants, sources of information, and other entities that may be authorized to interact with the user and/or the resource access communication device to provide resource usage data to the user.

As shown in FIG. 6, process 1100 continues with block 1106, which includes in response to receiving the resource access request and the set of resource usage data, transmitting via the resource access device communication interface a control signal comprising a set of message data associated with the user, wherein the control signal causes a message to be presented to the user. It will be appreciated that the message presented to the user can take any of a number of forms, including but not limited to an audible message (such as a message played over a speaker associated with the resource access communication device and/or a secondary communication device), or a visible message (such as text and/or images presented to a user on a display associated with a resource access communication device and/or a secondary communication device).

In some example implementations, process 1100 and/or similar processes may be augmented to further cause a communication channel to be opened between a resource access communication device and a financial institution. For example, in situations where a user desires to speak with a customer service representative and/or communicate directly with the financial institution regarding instruction that the user wishes to convey, information that the financial institution seeks from the user, and otherwise, the resource access communication device may establish a communication channel by using network communication interfaces associated with the resource access communication device, the financial institution, and/or optional and/or intermediate communication devices, such a secondary communication devices and/or mobile devices.

As presented herein and described with respect to process 1100 and elsewhere in this disclosure, embodiments of the present invention contemplate effecting a physical change in a particular environment associated with a resource user. In particular, a resource access communication described herein is capable of receiving, converting, and processing audible, written, and/or visual acts by a user into a set of data that can be transmitted throughout a system, used to acquire information responsive to a request from a user, and effect a physical change in the form of creating an audible and/or visible display in response to a user's requests and/or command. As such, in at least some example implementations, the resource access communication device contemplates converting spoken words, visible body gestures, or written commands into resource transactions such as the deployment, reassignment, and/or conveyance of resources, and responsively conveying audible or visible feedback to the user.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium. Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s)

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s).

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A resource access communication system comprising:
a network communication interface;
a resource access device communication interface;
a memory device storing a resource access communication application; and
a processing device operatively coupled to the memory device, wherein the processing device is configured to execute computer-readable program code to:
receive via the resource access device communication interface a resource access request from a user of a resource access device;
detect a subset of resource access data associated with the resource access request based on a detection and parsing of audible statements from the user;
receive via the network communication interface a set of resource usage data associated with the user from third party sources, wherein receiving further comprises facilitation of access, deployment and accumulation of resources from the third party sources; and
in response to receiving the resource access request and the set of resource usage data, transmit via the resource access device communication interface a control signal comprising a set of message data associated with the user, wherein the control signal causes a message to be presented to the user.

2. The system of claim 1, wherein the message presented to the user is an audible message transmitted via a speaker associated with the resource access device.

3. The system of claim 1, wherein the message presented to the user is a visible message displayed on the resource access device.

4. The system of claim 1, wherein the resource usage data comprises a set of data received via the network communication interface from a financial institution.

5. The system of claim 4, wherein the resource usage data further comprises a set of data received via the network communication interface from a third-party system.

6. The system of claim 5, wherein the processing device is further configured to execute computer readable program code to open a communication channel between the resource access device and the financial institution.

7. A method for resource access communication, the method comprising:
receiving via a resource access device communication interface a resource access request from a user of a resource access device;
detecting a subset of resource access data associated with the resource access request based on a detection and parsing of audible statements from the user;
receiving via the network communication interface a set of resource usage data associated with the user from third party sources, wherein receiving further comprises facilitation of access, deployment and accumulation of resources from the third party sources; and in response to receiving the resource access request and the set of resource usage data, transmitting via the resource access device communication interface a control signal comprising a set of message data associated with the user, wherein the control signal causes a message to be presented to the user.

8. The method of claim 7, wherein the message presented to the user is an audible message transmitted via a speaker associated with the resource access device.

9. The method of claim 7, wherein the message presented to the user is a visible message displayed on the resource access device.

10. The method of claim 7, wherein the resource usage data comprises a set of data received via the network communication interface from a financial institution.

11. The method of claim 10, wherein the resource usage data further comprises a set of data received via the network communication interface from a third-party system.

12. The method of claim 11, further comprising opening a communication channel between the resource access device and the financial institution.

13. A computer program product for resource access communication, the computer program product comprising at least one non-transitory computer-readable medium having computer-readable program code portions embodied therein, the computer-readable program code portions comprising:

an executable portion configured for receiving via a resource access device communication interface a resource access request from a user of a resource access device;

an executable portion configured for detecting a subset of resource access data associated with the resource access request based on a detection and parsing of audible statements from the user;

an executable portion configured for receiving via a network communication interface a set of resource usage data associated with the user from third party sources, wherein receiving further comprises facilitation of access, deployment and accumulation of resources from the third party sources; and an executable portion configured for transmitting via the resource access device communication interface a control signal comprising a set of message data associated with the user, wherein the control signal causes a message to be presented to the user based on receiving the resource access request and the set of resource usage data.

14. The computer program product of claim 13, wherein the message presented to the user is an audible message transmitted via a speaker associated with the resource access device.

15. The computer program product of claim 13, wherein the message presented to the user is a visible message displayed on the resource access device.

16. The computer program product of claim 13, wherein the resource usage data comprises a set of data received via the network communication interface from a financial institution.

17. The computer program product of claim 16, wherein the resource usage data further comprises a set of data received via the network communication interface from a third-party system.

18. The computer program product of claim 17, further comprising opening a communication channel between the resource access device and the financial institution.

* * * * *